United States Patent
Lafon

[15] 3,686,319
[45] Aug. 22, 1972

[54] 2,4,6-TRIHYDROXY CHALCONE DERIVATIVES

[72] Inventor: Louis Lafon, 5 rue de l'Alboni, Paris, 16e, France

[22] Filed: March 5, 1970

[21] Appl. No.: 16,945

[30] Foreign Application Priority Data

March 5, 1969 Great Britain..........11,594/69

[52] U.S. Cl...................260/590, 260/571, 424/331, 424/330
[51] Int. Cl..............................................C07c 49/82
[58] Field of Search.....................................260/590

[56] References Cited

FOREIGN PATENTS OR APPLICATIONS 255,188 2/1963 Australia...................260/590

Primary Examiner—Daniel D. Horwitz
Attorney—Jacobs & Jacobs

[57] ABSTRACT

2,4,6-Trihydroxychalcone derivatives of the formula:

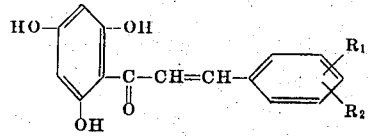

halogen, hydroxy,
wherein $R_1$ is hydrogen, halogen, hydroxy, nitro, alkoxy, amino, alkylamino or dialkylamino and $R_2$ is halogen, jydroxy, alkoxy, nitro, amino, alkylamino or dialkylamino, each of the alkyl portions of the aforesaid alkoxy, alkylamino or dialkylamino radicals having one to three carbon atoms, have hypocholeretic, hypotensive and anti-coagulant properties.

3 Claims, No Drawings

2,4,6-TRIHYDROXY CHALCONE DERIVATIVES

This invention relates to 2,4,6-trihydroxy-chalone derivatives, to their preparation and to pharmaceutical compositions containing them. -trihydroxy-chalcone The present invention provides, as new compounds, 2,4,6-trihydroxy chalcone derivatives of the formula:

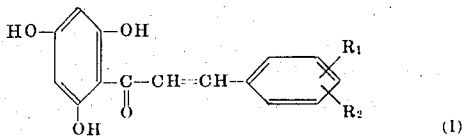

(1)

wherein $R_1$ is hydrogen, halogen, hydroxy, nitro, alkoxy, amino, alkylamino or dialkylamino and $R_2$ is halogen, hydroxy, alkoxy, nitro, amino, alkylamino or dialkylamino, each of the alkyl portions of the aforesaid alkoxy, alkylamino or dialkylamino radicals having one to three carbon atoms. In particular the present invention provides as new compounds 2,2',4,4',6-pentahydroxy-chalcone, 2,3',4,4',6-pentahydroxychalcone, 2,4,6-trihydroxy-3'-aminochalcone, 2,4,6-trihydroxy-4'-dimethylaminochalcone, 2,4,6-trihydroxy-3'-chlorochalcone, 2,3',4,6-tetrahydroxy-4'-methoxychalcone, 2,4,6-trihydroxy-3',4'-dimethoxychalcone, 2,4,6-trihydroxy-3'-nitrochalcone and 2,4,6-trihydroxy-4'-nitrochalcone.

The compounds of the present invention have interesting pharmaco-dynamic activity. More particularly they may be used as hypocholeretics, hypotensives and anticoagulants. Accordingly the present invention also provides pharmaceutical compositions comprising a 2,4,6-trihydroxychalcone derivative of formula (I) in association with a physiologically acceptable excipient. For example such compositions may be in the form of a tablet or capsule containing 0.20 to 0.40 g. of 2,4,6-trihydroxy-3'-chlorochalcone or containing 0.20 g. of 2,4,6-trihydroxy-3'-aminochalcone.

The new compounds can be prepared by condensing phloroacetophenone with a benzaldehyde of the formula:

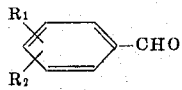

wherein $R_1$ and $R_2$ are as hereinbefore defined in a solvent medium especially acetic acid or ethanol in the presence of hydrochloric acid. The compound obtained is generally isolated by precipitation with water and then it is purified.

The following Examples illustrate the invention.

EXAMPLE 1

2,2',4,4',6-PENTAHYDROXY-CHALCONE

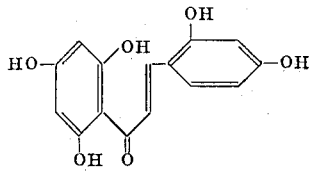

In a 500 cc. Erlenmeyer flask equipped with a stirrer, 16.8 g. (0.1 mol) of dry phloroacetophenone was dissolved in 50 cc. of slightly warm acetic acid. A solution of 13.8 g. (0.1 mol) of resorcyl aldehyde in 50 cc. of acetic acid was run into this solution. The temperature was raised to between 75° C. and 80° C. Then 4 cc. of dilute hydrochloric acid were added, a complete solution being formed. Stirring was continued for 1 hour and then the product was precipitated by the addition of 500 cc. of cold water during which the stirring was continued. The precipitate was separated by centrifugation and dried in vacuo in the presence of potassium hydroxide. The resulting product (14 g.) was purified by treating it with 400 cc. of boiling water to extract any unreacted phloroacetophenone and resorcyl aldehyde. Then the product was filtered, washed and dried in vacuo in the presence of potassium hydroxide.

The purified product was collected in the form of a red powder. The dry product weighed 9 g., corresponding to a yield of 28 percent. This product had no well-defined melting point. This compound was soluble in sodium hydroxide solution and acetone, slightly soluble in ethyl alcohol and acetic acid and insoluble in diethyl ether, water and benzene.

EXAMPLE 2

2,3',4,4',6-PENTAHYDROXY-CHALCONE

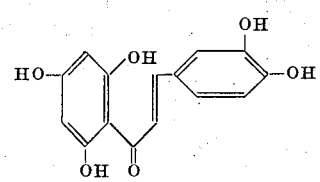

An Erlenmeyer flask equipped with a stirrer was charged with 50 cc. of acetic acid, 8.4 g. (0.05 mol) of dry phloroacetophenone and 7.5 g. (0.05 mol) of 3,4-dihydroxy-benzaldehyde, and then 3 cc. of concentrated hydrochloric acid were added. Intense color was formed and then a complete solution was obtained. This solution was left to stand at room temperature and then the product was precipitated in 500 cc. of cold water. The precipitate was removed by filtration, washed with water and dried in the presence of potassium hydroxide.

The dried product weighed 14 g. (a yield of 98 percent) and had no well defined melting point. This compound was soluble in sodium hydroxide solution and acetone, slightly soluble in ethyl alcohol and acetic acid and insoluble in diethyl ether, water and benzene.

EXAMPLE 3

2,4,6-TRIHYDROXY-3'-AMINO-CHALCONE

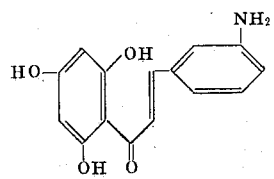

70 cc. of acetic acid, 8.4 g. (0.05 mol) of dry phloroacetophenone and 7.56 g. of 3-aminobenzaldehyde (or 0.05 mol for a commercial product of 80 percent concentration) were run into a 200 cc. Erlenmeyer flask equipped with a stirrer. 10 cc. of concentrated hydrochloric acid were added to the suspension so formed, intense coloration was observed and then a complete solution was obtained. This solution was left to stand for 24 hours and then was poured with stirring into 500 cc. of cold water. No precipitation took place. Sodium bicarbonate was gradually added until pH reached 5. The product was extracted with ethyl acetate and then dried by evaporation.

The dried product weighed 12.8 g., corresponding to a yield of 94.5 percent. Melting point: 250° C. (not very well defined and some decomposition occurred), This product was slightly soluble in sodium hydroxide solution, acetone and ethyl acetate and insoluble in hydrochloric acid, diethyl ether, ethyl alcohol, benzene and dimethyl formamide.

EXAMPLE 4

2,4,6-TRIHYDROXY-4'-DIMETHYLAMINO-CHALCONE

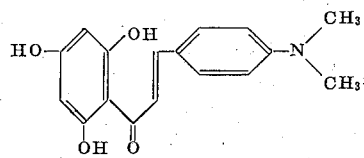

A 200 cc. Erlenmeyer flask equipped with a stirrer was charged with 30 cc. of ethyl alcohol, 20 cc. of water, 8.4 g. (0.05 mol) of dry phloroacetophenone and 7.5 g. (0.05 mol) of para-dimethylaminobenzaldehyde. 20 cc. of concentrated hydrochloric acid were then added. This mixture was stirred for 1 hour and then any unreacted phloroacetophenone was removed by extraction with diethyl ether. The aqueous layer so obtained was then "salted-out" by the addition of sodium acetate until the pH reached 5. Extraction with ethyl acetate was followed by washing in water and evaporation to dryness. The residue so obtained was further purified by the addition of diethyl ether to remove any remaining unreacted compounds. 7.4 g. (i.e., a yield of 35 percent) of a compound in the form of a deep violet powder which had no well defined melting point were obtained.

This compound was soluble in sodium hydroxide solution, slightly soluble in acetone and insoluble in water, hydrochloric acid, diethyl ether, ethyl alcohol, benzene and petroleum ether.

EXAMPLE 5

2,4,6-TRIHYDROXY-3'-CHLORO-CHALCONE

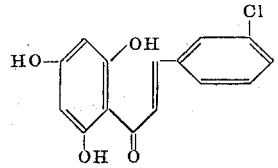

A 200 cc. Erlenmeyer flask was charged with 50 cc. of acetic acid, 8.4 g. (0.05 mol) of dry phloroacetophenone and 7 g. (0.05 mol) of pure 3-chlorobenzaldehyde. This mixture was stirred to form a yellow suspension and then 4 cc. of concentrated hydrochloric acid were added to it. A solution formed rapidly, and then after 2 to 3 minutes the solution coagulated. This was left to stand overnight and then the product was precipitate in 200 cc. of cold water, removed by filtration, washed in water and dried over potassium hydroxide.

The dried product weighed 14.2 g., corresponding to a yield of 98 percent, and had no well-defined melting point. It was soluble in acetone and sodium hydroxide solution and insoluble in water, diethyl ether and benzene.

EXAMPLE 6

2,3',4,6-TETRAHYDROXY-4'-METHOXY-CHALCONE

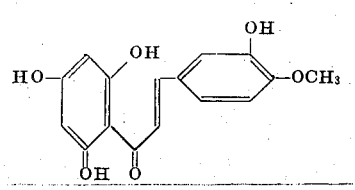

A 200 cc. Erlenmeyer flask equipped with a stirrer was charged with 50 cc. of acetic acid, 8.4 g. (0.05 mol) of dry phloroacetophenone and 7.5 g. (0.05 mol) of isovanillin. Partial solution was observed. 3 cc. of concentrated hydrochloric acid were added, an intense red color being observed followed by formation of a complete solution within about 15 minutes. This solution was left to stand for 24 hours at room temperature. Then 500 cc. of cold water were run in resulting in the formation of a salmon-pink precipitate, which was removed by filtration, washed in water and dried in the presence of potassium hydroxide.

The dried product weighed 14.8 g., corresponding to a yield of 98.5 percent. Kofler melting point: 250° C. to 260° C. (not very well defined and some decomposition occurred). This product was soluble in sodium hydroxide solution, acetone, and acetic acid and insoluble in water, diethyl ether and benzene.

EXAMPLE 7

2,4,6-TRIHYDROXY-3',4'-DIMETHOXY-CHALCONE

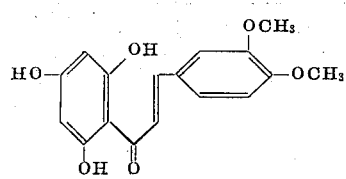

A 200 cc. Erlenmeyer flask equipped with a stirrer was charged with 50 cc. of acetic acid, 8.4 g. (0.05 mol) of dry phloroacetophenone and 8.5 g. (0.05 mol) of veratraldehyde. 3 cc. of concentrated hydrochloric acid were then added. The mixture was left to stand for 24 hours and then was precipitated with stirring in 500 cc. of water. The resulting yellow-orange precipitate was removed by filtration, washed and dried over potassium hydroxide.

The dried product weighed 14 g. corresponding to a yield of 88 percent, and had no well defined melting point.

It was soluble in sodium hydroxide solution, acetone and acetic acid and insoluble in water, diethyl ether, ethyl alcohol and benzene.

EXAMPLE 8

2,4,6-TRIHYDROXY-3'-NITRO CHALCONE

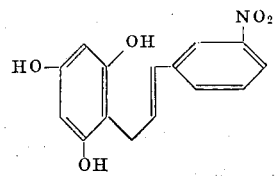

A 200 cc. Erlenmeyer flask equipped with a stirrer was charged with 60 cc. of acetic acid, 8.4 g. (0.05 mol) of dry phloroacetophenone and 7.55 g. (0.05 mol) of meta-nitrobenzaldehyde and stirred for 25 minutes. 3 cc. of concentrated hydrochloric acid were then added and the solution went red. Complete solution was observed and then reprecipitation occurred. The mixture was left to stand for 24 hours at room temperature and then 500 cc. of cold water were run in. The canary-yellow precipitate which formed was removed by filtration, washed in water and dried in the presence of potassium hydroxide.

The dried product weighed 13.3 g., corresponding to a yield of 88.5 percent and its melting point was about 260° C. (not very well defined and some decomposition occurred. It was soluble in sodium hydroxide solution and acetone and insoluble in water, diethyl ether, acetic acid, benzene and dimethyl formamide.

EXAMPLE 9

2,4,6-TRIHYDROXY-4'-NITRO CHALCONE

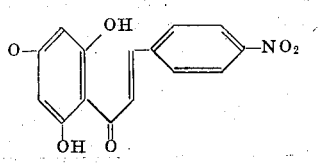

A 200 cc. Erlenmeyer flask equipped with a stirrer was charged with 60 cc. of acetic acid, 9.35 g. (0.0557 mol) of dry phloroacetophenone and 8.4 g. (0.0557 mol) of para-nitro-benzaldehyde. After 15 minutes, solution not being complete, 3 cc. of concentrated hydrochloric acid were added. Complete solution and an intense red color were then observed, this being followed by reprecipitation and coagulation. The mixture was left to stand overnight and then poured with stirring into 500 cc. of water. The yellow-orange precipitate so formed was removed by filtration, washed in water and dried in vacuo in the presence of potassium hydroxide.

The dried product weighed 14.4 g. corresponding to a yield of 86 percent, and its melting point was about 260° C. (not very well defined, and some decomposition occurred). It was soluble in sodium hydroxide solution and acetone and insoluble in water, diethyl ether, acetic acid, benzene and dimethylformamide.

The pharmacodynamic properties of the new 2,4,6-trihydroxy-chalcone derivatives are shown below:

2,2',4,4',6-PENTAHYDROXY CHALCONE

When used in solution form the compound is dissolved in sodium hydroxide solution and the solution is brought to a pH of 7 by adding hydrochloric acid.

1. Acute toxicity in mice.

A — Compound used in the form of an aqueous suspension. When the compound was administered by the gastric route at a dosage of 1 g/kg the mortality rate was nil. Sedation and ptosis were observed.

B — Compound in solution form. When the compound was administered intraveneously the $LD_{50}$ was $182 \pm 37$ mg./kg.

Symptoms: Diarrhoea, lachrymation, pink coloration for 24 hours in the vein in which the substance has been received. Urine orange colored. Death occurs by respiratory stoppage.

C — Observation on animals receiving 500 mg./kg. of the compound in solution form by gastric route.

No symptoms were observed, apart from slight hypothermia (−0.7°).

2. Anti-spasmodic action.

A — In vitro. Isolated duodenum of rat.

Organs in a relaxed state: When administered at a dosage of 100 $\gamma$/cc., the compound very slightly reduces the tone of the organs.

Action in conjunction with barium chloride: When administered at a dosage of 10 or 100 $\gamma$/cc., the compound decreases contractions produced by barium chloride.

Action in conjunction with acetyl choline: At a dosage of 10 or 100 $\gamma$/cc., the compound decreases the contractions produced by acetyl choline.

B — In vivo. Ileum of guinea pig.

Intravenous Injection: When administered at a dosage of 10 mg./kg. (about one-twentieth of the intravenous $LD_{50}$ in mice), the compound arrests peristalsis for 6 to 10 min. The return to normal is observed to be very rapid.

Note: Marked hypotension, 72 percent on average, has been observed for 20 to 30 min.

When administered at a dosage of 20 mg./kg. (about one-tenth of the intravenous $LD_{50}$ in mice), the compound arrests peristalsis in an animal for 20 min., and at the same time 66 percent hypotension is observed for 30 min.

Intra-duodenal administration: When administered to guinea pigs intraduodenally at a dosage of 100 mg./kg., the compound arrests peristalsis after 20 to 60 min. The anti-spasm index is 95 percent and at the same time a hypotension of 25 percent to 40 percent is observed.

3. Action on choleresis in anaestetized rats

Intravenous injection of the compound at a dosage of 20 mg./kg. (one-tenth of the intravenous $LD_{50}$ in mice) produces 33 percent hypocholeresis for 15 min. The bile is colored red 30 min. after injection.

This compound is particularly effective as a hypocholeretic.

2,3',4,4',6-PENTAHYDROXY CHALCONE

The compound is used after being dissolved in sodium hydroxide solution and an excess with hydrochloric acid added.

1. Acute toxicity in mice

When the compound is administered intravenously the $LD_{50}$ was $82.5 \pm 3$ mg./kg. Sedation and lachrymation are observed.

When it is administered intramuscularly at a dosage of 40 mg./kg., sedation, hypothermia (−2.9°), mild tranquillizing and mild analgesic action are observed.

2. Cardiovascular properties studied on the isolated heart of a rabbit

When the compound was administered at a dosage of 1γ/cc.: the coronary output increased by from 60 percent to 100 percent. This corresponds to twice the activity of papaverine.

3. Anti-spasmodic action
   a. Guinea pig ileum in situ: When the compound was intravenously administered at a dosage of 8 mg./kg., peristalsis was reduced, the maximum effect being observed after 30 min. There is 55 percent to 70 percent hypotension.
   b. Action on Oddi's sphincter in dogs: When the compound was administered intravenously at a dosage of 8 mg./kg., distinct anti-spasmodic action on the intestine and on Oddi's sphincter were observed for 20 min. on average.

4. Action on choleresis in anaesthetized dogs
   Hypocholeretic action was observed when the compound was administered intravenously at a dosage of 8 mg./kg.

This compound is in particular a hypocholeretic having also an anti-spasmodic action on unstriated muscle fiber.

2,4,6-TRIHYDROXY-3',-AMINO CHALCONE

1. Acute toxicity in the mouse
   When administered orally at a dosage of 1 g./kg. the compound kills two animals out of 12. Death occurs 4 days after administration. No symptoms are observed.

2. Tolerance by gastric route in conscious dogs
   The compound in aqueous suspension at a concentration of 100 mg./cc. administered orally to dogs at a dosage of 500 mg./kg., in a volume of 5 cc./kg. Tolerance is complete and no symptoms are observed.

3. Anti-spasmodic action
   Guinea pig ileum in situ
   When administered intra-duodenally at a dosage of 125 mg./kg. the compound reduces or arrests peristalsis for from 10 to more than 80 min. The index of peristalsis (number of contractions in 10 min. × mean amplitude) is reduced on average by 53 percent. Return to normal is observed. No effect on the arterial blood pressure is observed.

When administered intra-duodenally at a dosage of 250 mg./kg., the compound arrests or reduces peristalsis for from 20 to more than 60 min. The index of peristalsis is reduced on average by 88 percent. In general, the effect is observed after 9 to 25 min. Return to normal is observed.

The compound has an intestinal anti-spasmodic effect on guinea pigs. It also has an interesting hypocholeretic action, producing 31 percent hypocholeresis in an anaesthetized rat for more than 45 minutes when administered intraperitoneally at a dosage of 125 mg./kg.

When taken by man in doses of 0.20 g. four times a day, the compound displays a good effect on hepatic complaints.

2,4,6-TRIHYDROXY-4'-DIMETHYLAMINO CHALCONE

The compound is used in the form of an aqueous suspension.

1. Acute toxicity in mice
   When the compound is administered intraperitoneally at the maximum injectable dosage of 400 mg./kg. no toxic effects are observed. The animals display abdominal contractions and pilo erection. The compound has neither analgesic nor tranquillizing action.

2. Cardiovascular properties studied on the isolated heart of a rabbit
   When used in conjunction with barium chloride, the compound in doses of 1 to 100 γ/cc., has the following effects:
   a. dilates the coronaries in proportions to the dose;
   b. has a negative inotropic effect at 10 and 100 γ/cc.;
   c. has a negative chronotropic effect at 10 and 100 γ/cc.

3. Anti-spasmodic properties
   In vitro: isolated duodenum of rat.
   Organs contracted by barium chloride: When administered at a dosage of 1 cc. of a 1 percent saturated solution to a 60 cc. cell, the compound decreases the spasmodic action of the barium.

4. Action on choleresis
   When intra-peritoneally administered to an anaesthetized rat, in the form of a suspension in water and "Tween 80", at a dosage of 200 mg./kg., the compound reduces the bile output by 33 percent for 15 min.

This compound has particularly interesting hypocholeretic properties.

2,4,6-TRIHYDROXY-3'-CHLORO CHALCONE

The compound was dissolved in sodium hydroxide solution (solubility less than 1 percent) and then neutralized with hydrochloric acid. It was used as a stable suspension in the presence of a slight excess of sodium chloride.

1. Acute toxicity
   When the compound was administered orally to mice the mortality observed was nil at 1 g./kg. At a dosage of 2 g./kg. administered orally, two animals out of 12 died within 48 hours. No symptoms were observed.
   Observation of animals receiving 600 mg./kg. of product orally: No symptoms were observed, apart from slight hyperthermia of 0.2°.

2. Anti-spasmodic action
   Guinea pig ileum in situ: When administered intra-duodenally at a dosage of 200 mg./kg., the compound arrests or reduces peristalsis. The index of peristalsis drops on average by 70 percent for from 20 to more than 100 min. At the same time, 12 percent to 62 percent hypertension was found in 3 experiments and 25 percent hypotension in the fourth experiment.

Anti-spasmodic action in dogs: When administered intra-duodenally at a dosage of 200 mg./kg., to 4 dogs subjected to the action of prostigmine + morphine, the compound had an anti-spasmodic action. There was a reduction in the intestinal peristalsis with a slight increase in tone, for about 20 min. Variations in the forcing pressure of Oddi's sphincter were reduced on average by 40 percent for a period varying between 30 and 60 min.

3. Action on choleresis
   The compound was administered intra-duodenally at a dosage of 200 mg./kg., to 2 sets of anaesthetized rats. In the first set, 43 percent hypocholeresis was observed for 15 mins.; and in the second set, 29 percent hypocholeresis for 15 min.

The compound has also been tested, as regards its action on choleresis, on dogs, at a dosage of 200 mg./kg., administered intra-duodenally. An average reduction of 38 percent in the bile output was observed. This reduction lasted more than half an hour.

This compound is particularly effective as a hypocholeretic.

For use in the treatment of man, the compound may be used in the form of capsules or tablets containing 0.20 to 0.40 g. of the active ingredient to be administered 3 to 6 times per day. Clinical tests confirm the pharmacological tests performed on animals.

The compound was preventatively administered at a dose of 3 capsules, each containing 0.20 g. of the compound, to 10 patients who had been subjected to a morphine-choleretic test (Test of du Fablet, Debray and Hardouin). In 8 cases the occurrence of biliary pain and bilious attacks was suppressed.

Used at a dosage of 3 capsules per day the compound gives excellent results in the treatment of biliary pain and bilious attacks.

2,3',4,6-TETRAHYDROXY-4'-METHOXY CHALCONE

The compound is dissolved in sodium hydroxide solution, the excess being neutralized with hydrochloric acid (final pH 7).

1. Acute toxicity in mice

When administered intravenously the compound has an $LD_{50}$ of $65 \pm 12$ mg./kg.

Observation on animals receiving 35 mg./kg. of the compound intramuscularly.

Sedation, dypsnoea, haematuria, hypothermia (−2.8°) and mydriasis are observed. The compound has some slight analgesic action and a moderate tranquillizing effect.

2. Cardiovascular properties studied on the isolated heart of a rabbit

The compound was used in "solution" in the Van Dyke Hasting liquid perfusing the heart.

In hearts constricted with barium chloride, the compound, when tested at dosages of 100 and 10 γ/cc. dilates the coronaries, has a slight positive inotropic action, does not alter the rate of the heart beat at 10 γ/cc., but reduces it (50 percent) at 100 γ/cc.

As regards its coronary dilation, the product is twice as active as papaverine (88 percent and 74 percent dilation of 2 γ/cc.). (Toxicity of papaverine when administered intravenously: $LD_{50} = 36$ mg./kg.). This compound has useful coronary dilating properties.

3. Experiments on dogs

A chloralosed animal was given intravenously a dose of 5 mg./kg. Hypotension was observed, lasting on average 45 min., at a level of from 20 percent to 30 percent of the dog's initial arterial pressure.

2,4,6-TRIHYDROXY-3',4'-DIMETHOXY CHALCONE

1. Acute toxicity in mice

When administered intravenously the compound has an $LD_{50}$ of $97 \pm 8$ mg./kg.

Symptoms: Exophthalmia, diarrhoea, bleeding at site of injection for an extended time.

With very high dosages (340 mg./kg.), nasal and oral hemorrhages were observed. Autopsy showed the lungs apparently hemorrhaged.

Observation on animals receiving 52.5 mg./kg. of the compound intramuscularly

No symptoms apart from slight hypothermia (−0.7°) were observed.

2. Anti-spasmodic properties A — In vitro — Isolated duodenum of rat.

Organs in relaxed state

When administered at dosages of 200 and 250 γ/cc., the compound causes very slight lowering of tone.

Organs contracted with acetyl choline

When administered at a dosage of 1 mg./cc., the compound reduces the organ contraction by 20 percent to 30 percent.

B — In vivo — Guinea pig ileum in situ.

When injected intravenously into guinea pigs at a dosage of 10 mg./kg. (one-tenth the intravenous $LD_{50}$), the compound arrests peristalsis for 2 to 15 min., this being followed by frequency stimulation.

Marked hypotension, amounting to about 60 percent, is also observed.

2,4,6-TRIHYDROXY-3'-NITRO CHALCONE

The compound is dissolved in sodium hydroxide solution and the excess neutralized with hydrochloric acid.

When administered intravenously to mice the compound has an $LD_{50}$ of $71 \pm 5$ mg./kg. The animals die from acute oedema of the lung.

When administered at a dosage of 1 mg./kg., the compound produces very marked hypotension in guinea pigs in vivo.

When administered intravenously to dogs at a dosage of 5 mg./kg. the compound produces 20 percent to 40 percent hypotension, which lasts on average one hour.

2,4,6-TRIHYDROXY-4'-NITRO CHALCONE

The compound is dissolved in sodium hydroxide solution and neutralized with hydrochloric acid.

1. Acute toxicity in mice

When the compound is administered intravenously at a dosage of 85 mg./kg., a mortality rate of 3/12 of the animals is observed.

Symptoms: sedation, pilo-erection, lachrymation and diarrhoea.

When the compound in crude form (i.e., not in solution) is administered orally to mice at a dosage of 400 mg./kg. it produces nil mortality.

2. Anti-coagulant action

A study of anti-coagulant action was carried out on rabbits. The compound has a distinct anti-vitamin K action which is observed after the ingestion of 2 g./kg. of the product.

This compound has advantages as an anti-coagulant. In the treatment of man, it may be used in the form of a capsule or tablet containing 0.05 g. to 0.10 g., the dose being from 3 to 4 capsules or tablets per day.

I claim:

1. 2,4,6-Trihydroxy-chalcone derivatives of the formula:

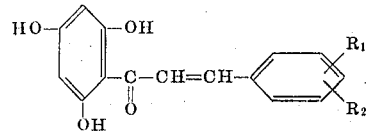

wherein $R_1$ is hydrogen and $R_2$ is nitro.

2. A 2,4,6-trihydroxychalcone derivative according to claim 1 which is 2,4,6-trihydroxy-3'-nitrochalcone.

3. A 2,4,6-trihydroxychalcone derivative according to claim 1 which is 2,4,6-trihydroxy-4'-nitrochalcone.

* * * * *